US 7,266,588 B2

(12) United States Patent
Oku (10) Patent No.: US 7,266,588 B2
(45) Date of Patent: Sep. 4, 2007

(54) NETWORK SERVICE SYSTEM AND METHOD INCLUDING A CHANNEL GENERATOR

(75) Inventor: Kazuho Oku, Kyoto (JP)

(73) Assignee: NHN Corporation, Seoul (KR)

( * ) Notice: Subject to any disclaimer, the term of this patent is extended or adjusted under 35 U.S.C. 154(b) by 654 days.

(21) Appl. No.: 09/876,576

(22) Filed: Jun. 7, 2001

(65) Prior Publication Data

US 2001/0051997 A1 Dec. 13, 2001

(30) Foreign Application Priority Data

Jun. 10, 2000 (KR) ............... 2000-32004
Aug. 21, 2000 (KR) ............... 2000-48415

(51) Int. Cl.
*G06F 15/16* (2006.01)
*G06F 15/173* (2006.01)

(52) U.S. Cl. ............ 709/217; 709/203; 709/219; 709/227; 709/228; 709/229; 709/238; 707/10; 705/1

(58) Field of Classification Search ........ 709/217–219, 709/203, 227, 229, 238; 707/10; 705/1
See application file for complete search history.

(56) References Cited

U.S. PATENT DOCUMENTS

| | | | | |
|---|---|---|---|---|
| 5,905,736 A * | 5/1999 | Ronen et al. | ............ | 370/546 |
| 6,028,600 A * | 2/2000 | Rosin et al. | ............ | 715/718 |
| 6,138,156 A * | 10/2000 | Fletcher et al. | ............ | 709/224 |
| 6,185,625 B1 * | 2/2001 | Tso et al. | ............ | 709/203 |
| 6,453,329 B1 * | 9/2002 | Dodgen | ............ | 709/246 |
| 6,519,568 B1 * | 2/2003 | Harvey et al. | ............ | 705/1 |
| 6,556,997 B1 * | 4/2003 | Levy | ............ | 707/10 |
| 6,594,682 B2 * | 7/2003 | Peterson et al. | ............ | 709/219 |
| 6,604,143 B1 * | 8/2003 | Nagar et al. | ............ | 709/229 |
| 6,643,661 B2 * | 11/2003 | Polizzi et al. | ............ | 707/100 |
| 6,684,087 B1 * | 1/2004 | Yu et al. | ............ | 455/566 |
| 6,704,024 B2 * | 3/2004 | Robotham et al. | ............ | 709/203 |
| 6,742,047 B1 * | 5/2004 | Tso | ............ | 709/246 |
| 6,857,102 B1 * | 2/2005 | Bickmore et al. | ............ | 715/501.1 |
| 7,020,721 B1 * | 3/2006 | Levenberg | ............ | 709/246 |
| 7,149,772 B1 * | 12/2006 | Kalavade | ............ | 709/203 |
| 2004/0160637 A1 * | 8/2004 | Tuli | ............ | 358/1.15 |

FOREIGN PATENT DOCUMENTS

| | | |
|---|---|---|
| CN | 1172568 | 2/1998 |
| EP | 0 908 832 A3 | 4/1999 |
| JP | 10-334056 | 12/1998 |

* cited by examiner

*Primary Examiner*—David Wiley
*Assistant Examiner*—Alina Boutah
(74) *Attorney, Agent, or Firm*—Occhiuti Rohlicek & Tsao LLP (57) ABSTRACT

Disclosed is a network service system and method. A data server receives contents from a plurality of network web servers that provide the contents, and provides them to a portable terminal via the network. The data server comprises a contents processor for processing the contents transmitted by the web servers according to standards of the portable terminal. Accordingly, since the contents provided by the web servers are converted according to standards, performance and parameters of the portable terminal and are then transmitted, a portable terminal user can appropriately receive information from contents providers that aim at general computer users.

21 Claims, 10 Drawing Sheets

NETWORK SERVICE SYSTEM AND METHOD INCLUDING A CHANNEL GENERATOR

BACKGROUND OF THE INVENTION (a) Field of the Invention

The present invention relates to a network service system and method. More specifically, the present invention relates to a technique for processing contents provided to a portable terminal.

(b) Description of the Related Art

As the Internet has been widely spread, contents providers (CP) that provide various contents via the Internet have also increased. Recently, as transmission speeds of the Internet have become faster, categories of contents provided by the contents providers are gradually expanding to various media such as still images, moving pictures and audio sources, as well as text.

Also, as the Internet services that use portable wireless terminals such as portable phones and personal digital assistants (PDA) have started, electronic mailing communication services and Internet contents searching services via the wireless terminals are increasing. Some contents providers provide portable-wireless-terminal-only contents to users who search desired information using the portable terminals. However, most of the contents providers only provide the contents to users who access the contents providers via general computers and wire networks and not to the portable wireless terminal users.

The portable wireless terminal user can, of course, access the general contents providers who provide information to computer users and receive desired contents using the user's portable wireless terminal. However, in this case, the following problems occur.

First, since the computer and the portable wireless terminal respectively have different information capacity, display standards and memory capacity for storing data, contents designed for computer monitor display cannot be properly displayed on the screen of the portable terminal.

Second, since the information receiving speed of the portable wireless terminal is slower than that of the general computer, it takes a longer time to receive the computer user contents using the portable terminal. Specifically, the information receiving speed becomes a big problem when the user accesses a general contents provider that provides huge capacity contents such as images as well as general text, using the user's portable wireless terminal.

Accordingly, conventionally, the user has received desired contents from the contents provider via a substitutive wireless terminal, but the contents that can be received through this method are limited.

Also, in the case of desiring to receive the contents of a predetermined field such as travel, the user has respectively had to access plural web servers that respectively provide various fields of contents one by one to receive corresponding contents. However, in this case, since the wireless Internet communication environments are unstable, the access states may be disconnected, and it takes much time and efforts to access each web server and receive desired contents.

SUMMARY OF THE INVENTION

It is an object of the present invention to provide a network service system and method for processing information provided by contents providers in order for a portable wireless terminal to receive the contents in an appropriate manner.

In one aspect of the present invention, a network service system comprises: a data server for receiving contents from a plurality of network web servers that respectively provide the contents, and providing the contents to a portable terminal via the network, the data server comprising a contents processor for processing the contents transmitted by the web servers according to standards of the portable terminal.

The contents processor has an image compression function for reducing sizes and number of colors of images, and the data server further comprises a proxy unit for calling the contents processor in the case the contents transmitted by the web servers contain image information.

In another aspect of the present invention, a data server to which a portable terminal is connected via a network for receiving contents from a plurality of web servers that respectively provide the contents comprises: an image compressor for receiving the contents from the web servers and reducing sizes or number of colors of images according to standards of the portable terminal; and a proxy unit for monitoring the contents transmitted by the portable terminal or the web server, and when the contents transmitted by the web servers include image information, calling the image compressor.

In a further aspect of the present invention, in a service method of a network service system, to which a portable terminal is connected via the network for receiving contents from a plurality of web servers that provide the contents, a network service method comprises: requesting, when a URL of a web server that provides the contents is input via the portable terminal, the contents from the web server corresponding to the input URL; reducing sizes or number of colors of the images of the contents transmitted by the web server and compressing the images according to standards of the portable terminal so as to convert the contents; and transmitting the converted contents to the portable terminal via the network.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiments of the invention have been shown and described, simply by way of illustration of the best modes contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
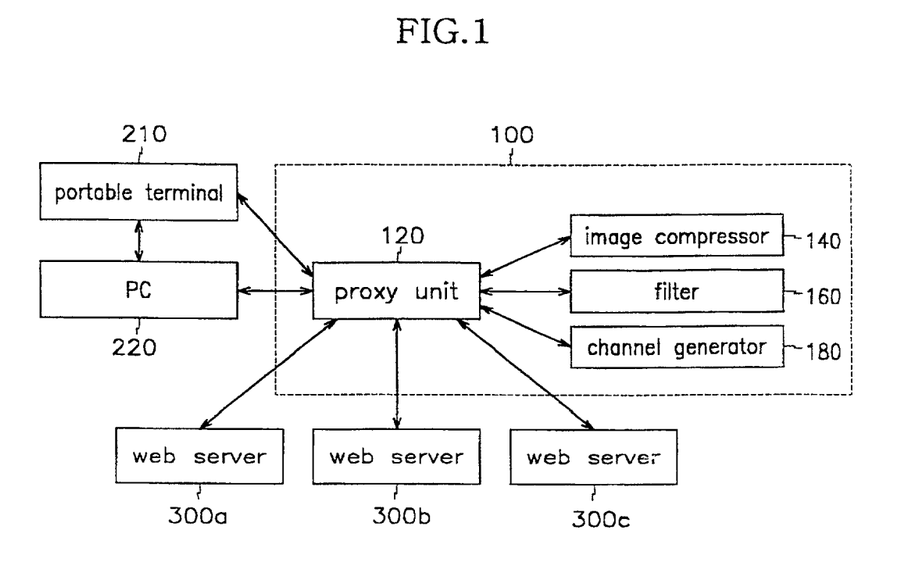
FIG. 1 shows an Internet service system according to a first preferred embodiment of the present invention.

FIG. 1 shows an Internet service system according to a first preferred embodiment of the present invention. In the first preferred embodiment, the contents are processed by a data server connected to a web server and a portable terminal or a user terminal device (both will be referred to as a user terminal hereinafter), for executing a predetermined program and performing a contents agency service.

As shown in FIG. 1, the Internet service system comprises a data server 100; user terminals 210 and 220; and a plurality of web servers 300a, 300b and 300c.

The web servers 300a to 300c provide contents on the Internet, and at least one of the web servers provides the contents aimed for general computers.

The data server 100 processes information provided by the web servers 300a to 300c in order for the portable terminal 210 to receive the contents in an appropriate manner, and it comprises a proxy unit 120; an image compressor 140; a filter 160; and a channel generator 180.

The image compressor 140 receives image information from the web server, reduces image sizes and number of colors, and compresses the images to fit the portable terminal. In this instance, since the portable terminal has a different screen size compared to PDAs and portable phones, the image compressor 140 reduces image sizes and number of colors, and compresses the images according to a screen size of the portable terminal.

The filter 160 filters information that is unnecessary or inappropriate for the portable terminal (e.g., moving picture information and advertisements) from the image information provided by the web server, and hence the unnecessary information is not provided to the portable terminal 210.

The channel generator 180 collects plural contents provided by respective plural web servers or plural contents provided by one single web server into a single channel. For example, the channel generator 180 respectively receives travel contents from plural web servers that provide travel contents and binds the travel contents into a travel channel. Hereinafter, this binding of desired contents will be referred to as a 'channeling.'

The proxy unit 120 monitors information that passes the data server 100 and calls the image compressor 140, the filter 160 and the channel generator 180.

In detail, the proxy unit 120 monitors the information that passes the data server 100 and, when finding image information, calls the image compressor 140. In the preferred embodiment, the image compressor 140 reduces the image sizes and number of colors and compresses the images according to established parameters. In this instance, the parameters can be established according to display standards of the user terminal or the user's direct manipulation of the parameters.

Also, the proxy unit 120 checks whether a requested uniform resource locator (URL) is appropriate for channeling, and in the case whereby it is, (i.e., an input URL is a channel URL), the proxy unit 120 calls the channel generator 180. Here, the channel URLs represent a set of URLs that can be bound into a channel. For example, in the case the URLs of the web servers that provide travel contents are respectively http://www.travel.com, http://www.picnic.com and http://www.travelers.com, the set of these URLs corresponds to the travel channel URLs.

A process for inputting the channel URLs will now be described. As exemplified in FIG. 2, the user terminals 210 and 220, in particular the portable terminal 210, have a set of icons. For example, the portable terminal 210 has the icons of newspapers, books, discs, sports, travel, games, movies, stocks and weather. These icons have information on the actual channel URLs. Therefore, when a user clicks the travel icon, the URL information of http://www.travel.com, http://www.picnic.com and http://www.travelers.com is transmitted to the data server 100.

Figure 2:
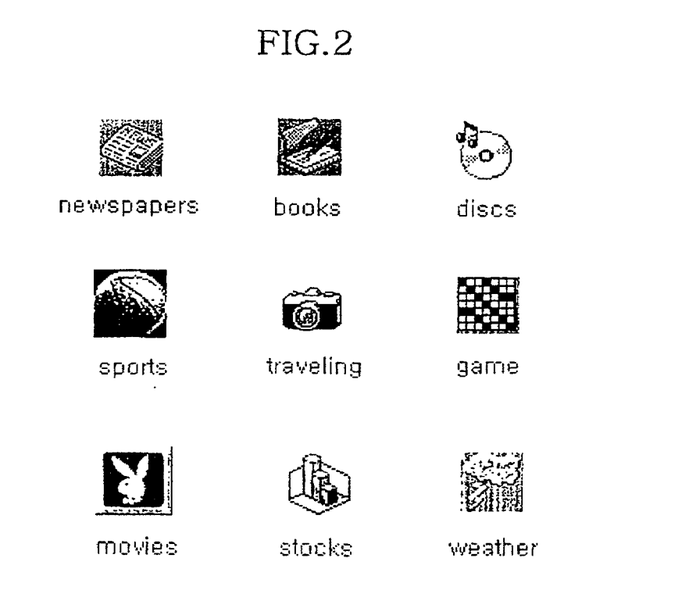
FIG. 2 shows examples of channel icons displayed on a portable terminal according to the first preferred embodiment of the present invention.

In the present embodiment, the user can input and transmit the URL or URLs by manipulating the user terminals 210 and 220, or can transmit the same by selecting the URL registered in a bookmark file of the user terminals 210 and 220 in the like manners of subsequent preferred embodiments.

The proxy unit 120 controls transmission timing of streams of a web page (e.g., an HTML including images) configured in a plurality of streams. For example, as to the web pages that include text and images, the proxy unit 120 initially transmits the text completely and then transmits image information of the web pages.

The user terminals 210 and 220 are connected to the data server via the network. In this instance, the user terminals include portable wireless terminals such as portable phones and PDAs, and personal computers, and as shown in FIG. 2, they have channel icon information. This channel icon information can be downloaded from the data server, or the user can directly create the icons on the user terminal. The user terminal according to the preferred embodiment can have a program for making or editing the channel icon information.

Particularly, the portable terminal 210 can directly download the channel icon information from the data server 100, or the user can directly make the icons on the computer that has a channel icon making program and receive the channel icon information of the computer. The portable terminal 210 displays the icons on the screen and selects a desired icon to transmit a corresponding URL or URLs to the data server 100.

The user terminal has a program for decompressing the contents compressed by the data server.

That is, since the present embodiment compresses the size-reduced and color-reduced contents and also compresses the contents while transmitting it, the user terminal has a decompressing function corresponding to these compression processes.

Referring to FIGS. 1 to 4, an operation of the Internet service system according to the first preferred embodiment will be described.

Figure 3:
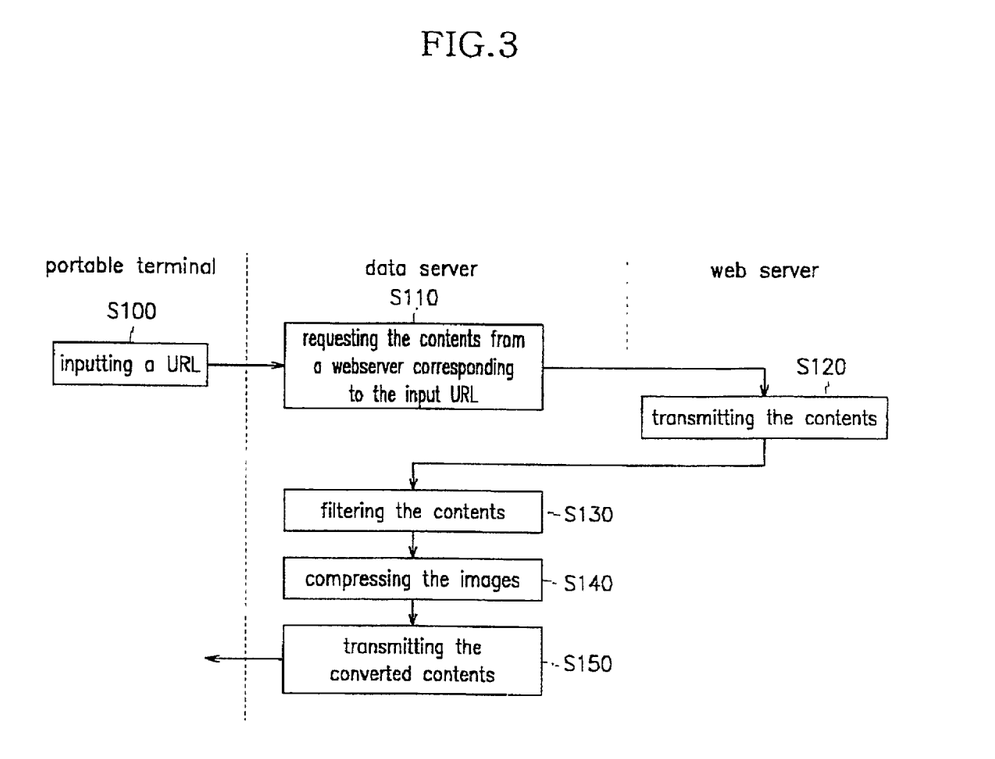
FIG. 3 shows a first operation of the Internet service system according to the first preferred embodiment of the present invention.

FIG. 3 shows a first operation of the Internet service system according to the first preferred embodiment of the present invention.

As shown, when a user accesses the data server 100 using the portable terminal 210 and inputs a URL of the web server that provides contents in step S100, the proxy unit 120 of the data server 100 requests contents from the web server (e.g., 300a) corresponding to the input URL in step S110.

The web server 300a transmits the contents corresponding to the URL to the data server 100, and the proxy unit 120 of the data server 100 transmits the contents to the filter 160 so as to filter information that is inappropriate or not necessary for the portable terminal, from among the contents provided by the web servers in step S130. After filtering the information, the proxy unit 120 calls the image compressor 140 and reduces the sizes and number of colors of the images, compresses the same and converts the contents in step S140.

After this, the proxy unit 120 transmits the converted contents to the portable terminal via the network in step S150. If the converted contents include a plurality of streams, the proxy unit 120 controls the transmission timing of the streams and transmits the converted contents.

As described, since the data server according to the first preferred embodiment of the present invention converts the contents provided by the web server according to the parameters of the portable terminal and transmits the converted contents, the user of the portable terminal can receive adequate information from the general contents provider. Also, since the data server according to the first preferred embodiment compresses the contents provided by the web server and transmits the same, the user can effectively receive information under the wireless network environment of a relatively slow transmission speed.

Figure 4:
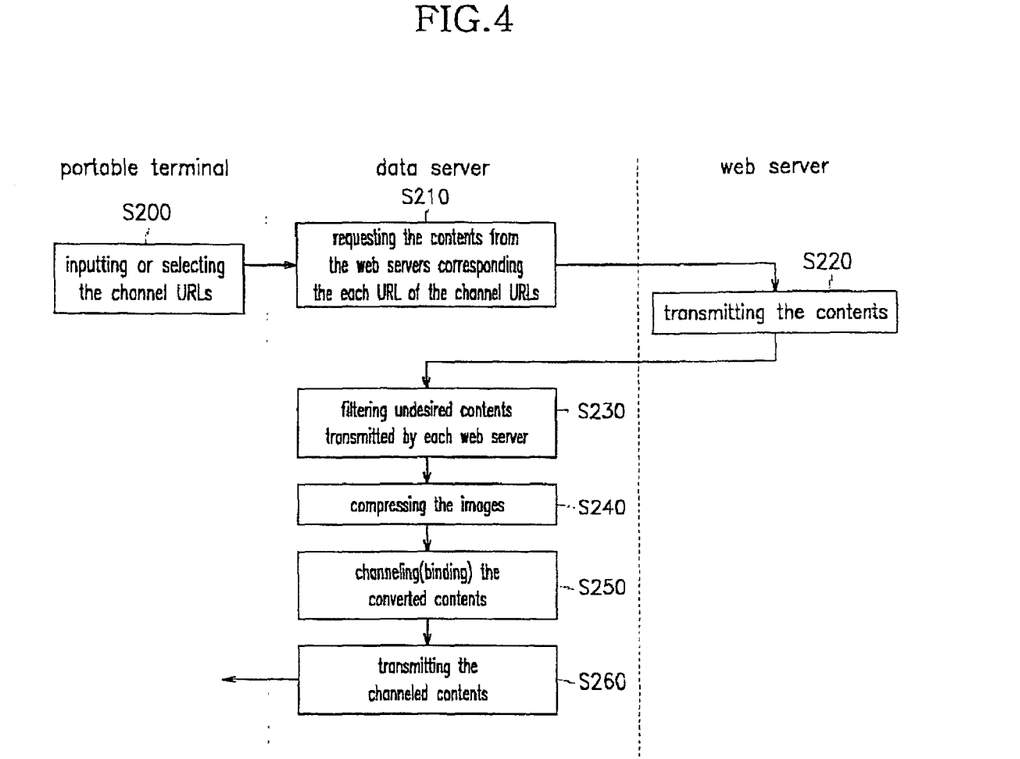
FIG. 4 shows a second operation of the Internet service system according to the first preferred embodiment of the present invention.

FIG. 4 shows a second operation of the Internet service system according to the first preferred embodiment of the present invention.

As shown, the user accesses the data server 100 using the portable terminal 210, and then selects or inputs channel URLs in step S200. In this instance, the user inputs the channel URLs by clicking the channel icon of the portable terminal as shown in FIG. 2.

The proxy unit 120 of the data server 100 requests contents from the web servers 300a and 300b corresponding to the respective URLs of the channel URLs in step S210, and the web servers 300a and 300b transmit the contents corresponding to the URLs to the data server 100 in step S220.

The filter 160 of the data server 100 filters information that is inappropriate or not necessary for the portable terminal, from among the contents provided by the web servers in step S230. After filtering the information, the proxy unit 120 calls the image compressor 140 and reduces the sizes and number of colors of the images, compresses the same and converts the contents in step S240.

After this, the proxy unit 120 calls the channel generator 180 and binds the converted contents into a channel (i.e., executing a channeling process) in step S250 and transmits the channeled contents to the portable terminal via the network in step S260.

As described above, since the data server according to the first preferred embodiment binds the contents provided by the respective web servers (i.e., executing a channeling process) and transmits the channeled information to the portable terminals at one time, the user can receive desired contents at one time without accessing the respective web servers using the portable terminal to receive the contents.

An Internet service system according to a second preferred embodiment will be described with reference to FIGS. 5 and 6. The second preferred embodiment shows an example of a data server, provided between a web server and a user terminal, for executing a predetermined program by its computation function to perform contents agency services.

Figure 5:
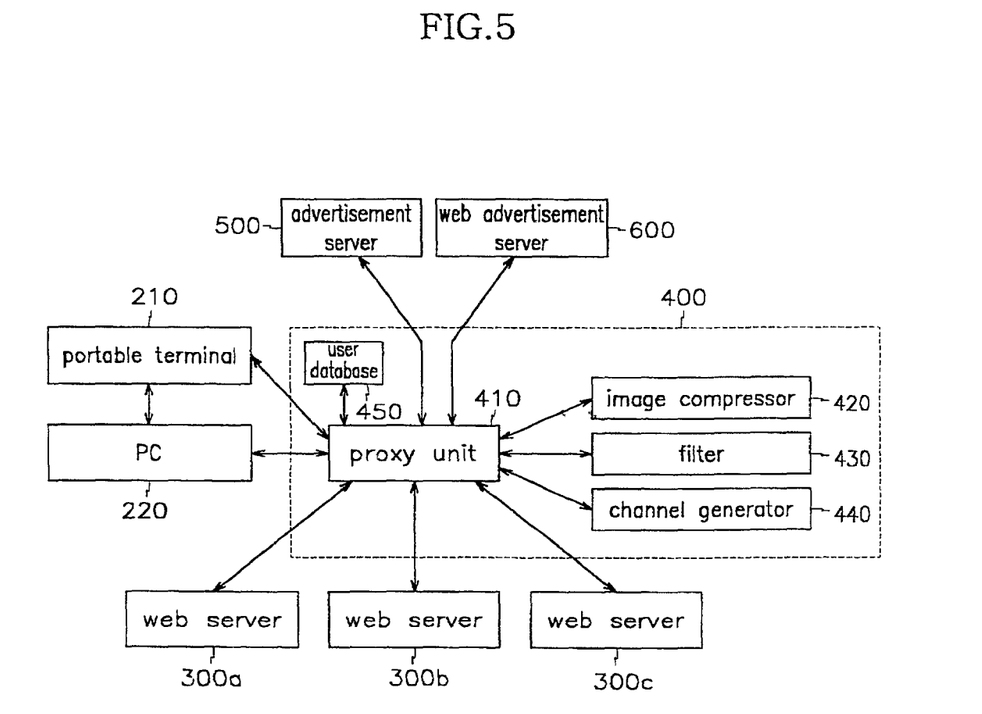
FIG. 5 shows an Internet service system according to a second preferred embodiment of the present invention.

FIG. 5 shows an Internet service system according to a second preferred embodiment of the present invention.

As shown, the Internet service system comprises user terminals 210 and 220; web servers 300a, 300b and 300c; a data server 400; an advertisement server 500; and a web advertisement server 600.

Functions and operations of the user terminals and the web servers according to the second preferred embodiment identical with those previously described according to the first preferred embodiment will not be repeated.

The advertisement server 500 is connected to the data server 400 via a network (e.g., an exclusive network) and stores various categories of advertisement information. Also, the web advertisement server 600 is a web server of a contents provider that specializes in advertisements, is connected to the data server 400 via the Internet, and stores information on various advertisements.

The data server 400 processes information provided by the web servers 300a to 300c, the advertisement server 500 and the web advertisement server 600 so that the portable terminal 210 may appropriately receive the contents. The data server 400 comprises a proxy unit 410; an image compressor 420; a filter 430; a channel generator 440; and a user database 450.

The user database 450 stores user data corresponding to the user information (e.g., ID and password). In this instance, the user data include general information such as users' ages, addresses and hobbies, users' electronic commerce information and advertisement information previously transmitted via the data server.

Functions and operations of the proxy unit 410, the image compressor 420, the filter 430 and the channel generator 440 according to the second preferred embodiment identical with those previously described according to the first preferred embodiment will not be repeated.

The channel generator 440 binds a plurality of contents respectively provided by the web servers, and advertisement contents provided by the advertisement server 500 or the web advertisement server 600 (i.e., performing a channeling process). In this instance, the advertisements provided by the advertisement server 500 or the web advertisement server 600 can be extracted according to the user data stored in the user database 450. Accordingly, for example, in the case an advertisement has not been provided to a particular user and a predetermined advertisement already provided to a predetermined user is updated, the updated advertisement is provided, and advertisements that excite the users according to their ages and sexes and advertisements that are restricted by the users' habitation areas are provided, thereby increasing the advertisement impacts.

An operation of the Internet service system according to the second preferred embodiment will now be described with reference to FIGS. 5 and 6.

Figure 6:
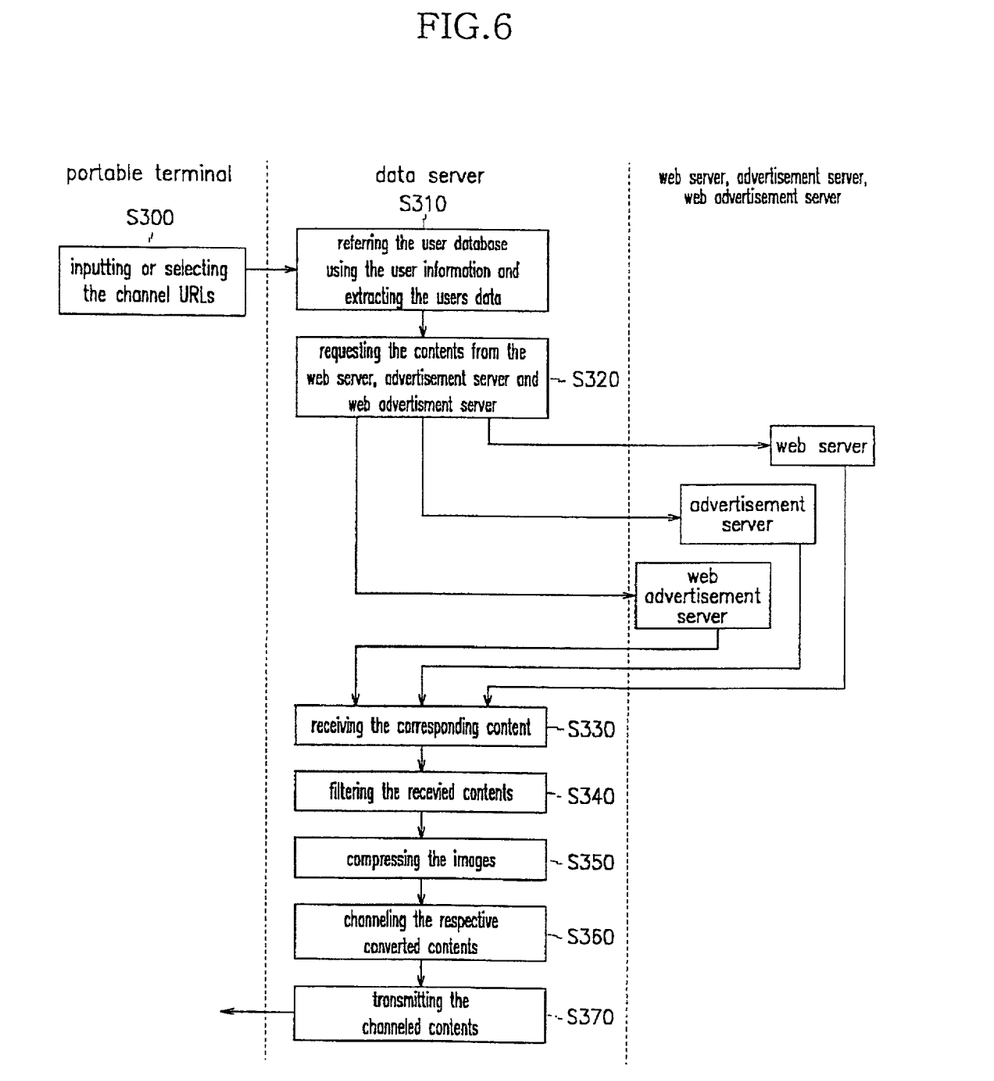
FIG. 6 shows an operation of the Internet service system according to the second preferred embodiment of the present invention.

FIG. 6 shows an operation of the Internet service system according to the second preferred embodiment of the present invention.

As shown in FIG. 6, a user accesses the data server 400 using the portable terminal 210, inputs user information such as ID and password, and selects or inputs channel URLs in step S300. In this instance, the user inputs the channel URLs by clicking the channel icon of the portable terminal 210 in a like manner of the first preferred embodiment.

The proxy unit 410 of the data server 400 refers to the user database 450 according to the input user information, and extracts general user information, electronic commerce information and previously transmitted advertisement information in step S310.

After this, the proxy unit 410 respectively requests contents from the web servers 300a and 300b corresponding to each URL of the channel URLs, and requests advertisement contents from the advertisement server 500 or the web advertisement server 600. In this instance, the proxy unit 410 transmits the user data extracted in the previous step S310 to the advertisement server 500 so that the advertisement server 500 may transmit advertisement contents appropriate for the user data. Also, the proxy unit 410 inputs a corresponding URL to automatically access the web advertisement server 600, and transmits the user data extracted in the previous step S310 to the web advertisement server 600 in step S320.

The web servers 300a and 300b, the advertisement server 500 and the web advertisement server 600 respectively transmit the requested contents to the data server 400 in step S330.

The proxy unit 410 of the data server 400 enables the filter 430 to filter information that is inappropriate or not necessary for the portable terminal from among the received contents in step S340. After the filtering of information, the proxy unit 410 calls the image compressor 420 and reduces the sizes and number of colors of the images, compresses the same and converts the contents in step S350.

After this, the proxy unit 410 calls the channel generator 440 to bind the converted contents in step S360. In this instance, the channel generator 440 inserts the advertisement contents provided by the advertisement server 500 or the web advertisement server 600 into the advertisement contents converted in the previous step S350, or provides the advertisement contents on an additional page to bind the same. After this, the proxy unit 410 transmits the channeled contents to the portable terminal via the network in step S370.

As described, since the data server according to the second preferred embodiment inserts the advertisement contents based on the user data provided by the advertisement server or the web advertisement server into the contents provided by the respective web servers and binds them (that is, channels them) and transmits the channeled information to the portable terminal once, the advertisement impacts can be maximized.

As to modifications and variations, the portable terminals can be PDAs, portable phones or other types of terminals. The orders of the processes of filtering, contents compression, and channeling can be changed if necessary.

In the preferred embodiments, the contents provider provides the contents via the Internet, and can further provide them via other formats of networks.

Figure 7:
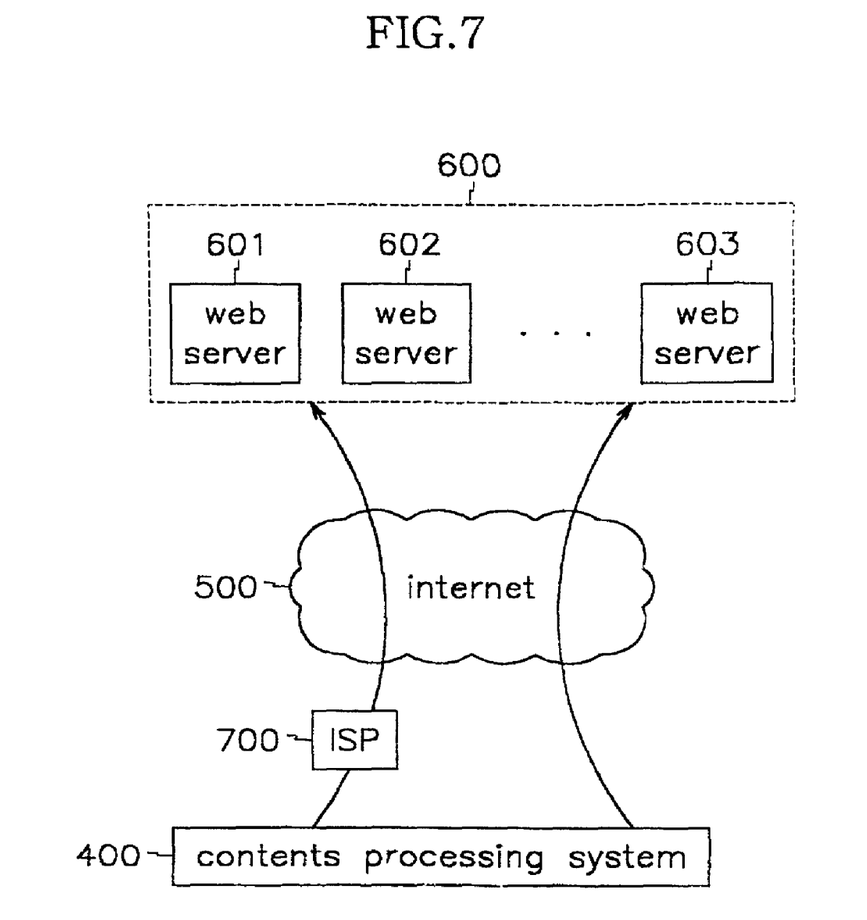
FIG. 7 shows network connection states of a contents processing system according to a third preferred embodiment of the present invention.
Figure 8:
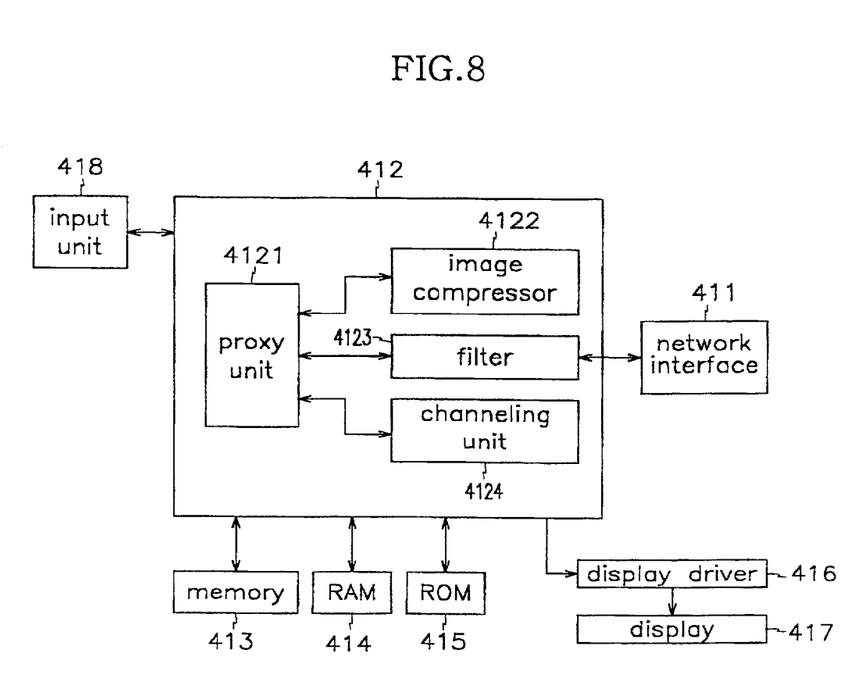
FIG. 8 shows a contents processing system according to a third preferred embodiment of the present invention.

FIG. 7 shows a contents processing system (e.g., a portable terminal) according to a third preferred embodiment of the present invention, and FIG. 8 shows a configuration of a contents processing system according to the third preferred embodiment of the present invention. That is, in the third preferred embodiment, the portable terminal executes a predetermined program by its computation function so as to process the provided contents and output the same to fit its standards.

As shown in FIG. 7, the contents processing system 400 is connected to the web servers 600 via a network such as the Internet 500, and processes the contents provided by the web servers 600 to fit the standards of the portable terminal.

To facilitate this, as shown in FIG. 8, the contents processing system 400 according to the third preferred embodiment comprises a network interface 411 for receiving the contents from the web server 600; a controller 412 for controlling the contents processing system and processing information to fit the portable terminal; a memory 413 for storing information processed by the controller 412; a random access memory (RAM) 414 for providing a region on which system software and user software are loaded by the controller 412; a read only memory (ROM) 415 on which a predetermined program executed by the controller 412 is previously installed; a display driver 416 for controlling and outputting video signals according to control signals of the controller 412; a display 417 for receiving the video signals output by the display driver 416 and displaying text or image information on a screen; and an input unit 418.

The input unit 418 can be any device for inputting data such as a keypad or a scanner. The network interface 411 can be a modem or a LAN card for accessing the web server 600 via the Internet 500. By using the network interface 411, the contents processing system 400 accesses the web server 600 via an Internet service provider (ISP) 700 or directly accesses the web server 600 without the ISP 700.

In the case an event is generated via the network interface 411 or the input unit 418, the controller 412 operates corresponding units so as to execute an operation corresponding to the event. The controller 412 comprises a contents processor, including a proxy unit 4121; an image compressor 4122; a filter 4123; and a channeling unit 4124, for receiving information including the contents provided by the web server 600 and data provided by the input unit 418, and converting the information to fit the standards of the portable terminal.

In this instance, events include operations for processing inputs and outputs of data and signals executed by the contents processing system such as data inputs via the network interface 411 or the input unit 418.

The image compressor 4122 reduces sizes and number of colors of the images and compresses the images to fit the portable terminal. In this instance, since the portable terminal has an image size different from those of the PDA and portable phones, the image compressor 4122 reduces sizes and number of colors of the images and compresses the images according to the image size of the portable terminal.

The filter 4123 filters information that is inappropriate or not necessary for the portable terminal (e.g., moving pictures and advertisements), from among the image information provided by the web server.

The channeling unit 4124 gathers various contents respectively provided by the web servers or the contents provided by a single web server into a single channel. For example, the channeling unit 4124 receives travel contents from a plurality of web servers that provide travel information and binds the travel contents to form a travel channel.

The proxy unit 4121 monitors information that passes through the contents processing system 400 to call and drive the image compressor 4122, the filter 4123 and the channeling unit 4124.

In detail, the proxy unit 4121 monitors the information in the contents processing system 400, and when finding image information, calls the image compressor 4122 to reduce the sizes and number of colors of the image and compress the image according to the established parameters. In this instance, the parameters can be set according to standards of the contents processing system or the user's direct setting.

Also, the proxy unit 4121 stores information (including the contents) processed by the image compressor 4122, the filter 4123 and the channeling unit 4124, and drives the display driver 416 to display converted information on the display 417.

The contents processing system 400 according to the third preferred embodiment can be portable terminals, such as portable phones and PDAs, for processing the contents provided by the web server 600 to fit the standards of the portable terminals and displaying access to the contents.

The web server 600 connected to the contents processing system 400 via the Internet is a web server of a contents provider that provides the contents on the Internet. At least one web server provides the contents for the general computers.

Figure 9:
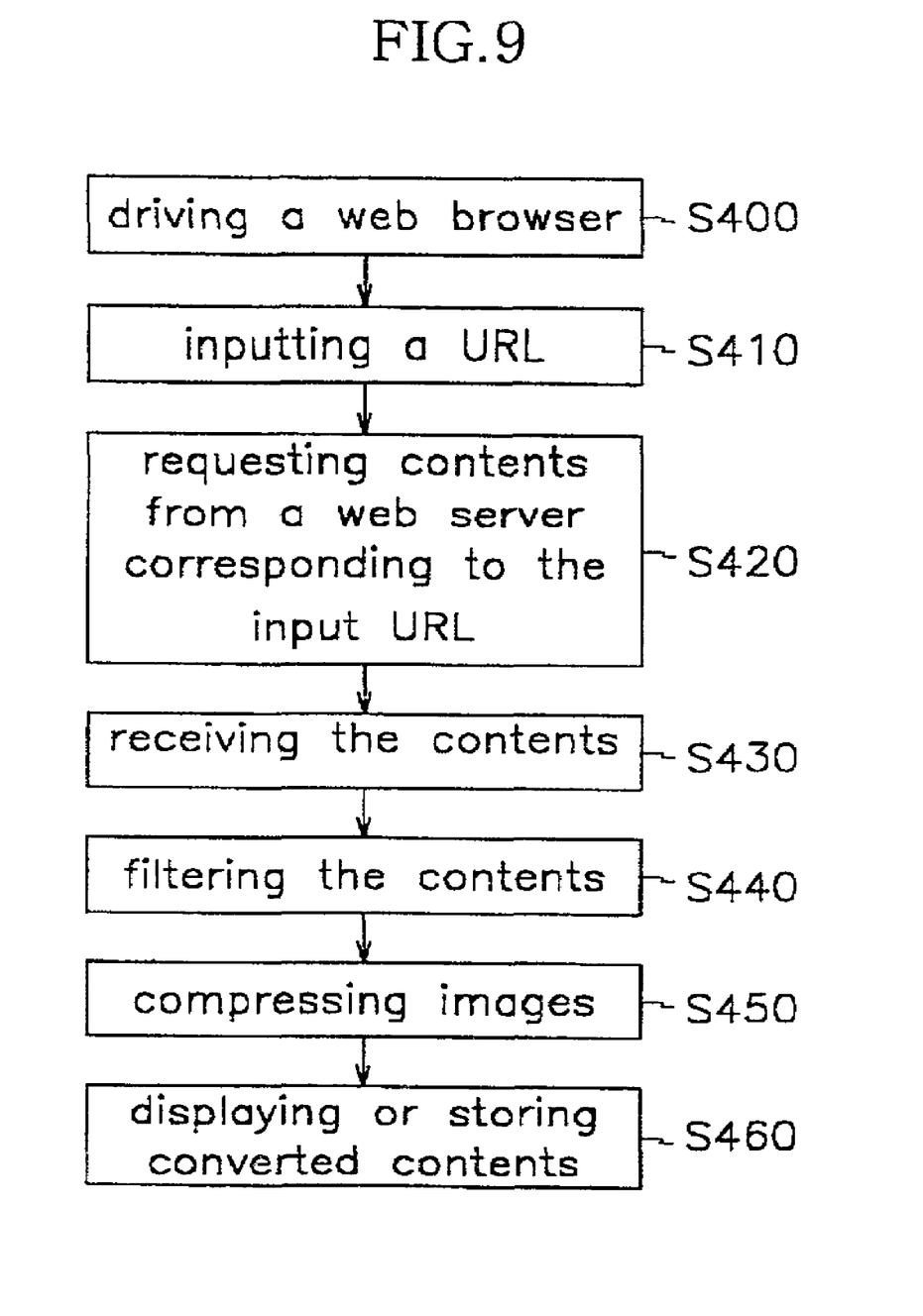
FIG. 9 shows an operation of the contents processing system according to the third preferred embodiment of the present invention.

Referring to FIGS. 7 to 9, an operation of processing the contents will now be described.

As shown in FIG. 9, when the input unit 418 inputs a signal for requesting to drive the user's web browser, the controller 412 loads the web browser (i.e., a browser for a portable terminal) into the RAM 414 and drives the same.

When a URL input window for accessing the web server is displayed on the display 417 because of driving the web browser and accordingly the user inputs the URL of the web server that provides the contents via the input unit 418, the URL information is passed through the wireless application protocol (WAP) gate, converted to wireless markup languages (WML), and transmitted to the web server 600 connected to the Internet 500 via the wireless network in steps S400 and S410.

When connected to the web server 600 via the Internet 500, the proxy unit 4121 of the controller 412 requests the contents from the web server 600 corresponding to the input URL in step S420, and in response to this, the web server 600 transmits the contents corresponding to the URL to the contents processing system 400.

The network interface 411 receives the contents from the web server 600 in step S430, and the proxy unit 4121 receives the contents and transmits the same to the filter 4123 to filter information that is inappropriate or not necessary for the portable terminal, from among the contents provided by the web server in step S440.

After the filtering of the information, the proxy unit 4121 calls the image compressor 4122 to reduce the sizes and number of colors of the image and compress the image according to the established parameters in step S450.

As described, after converting the contents provided by the web server 600 to fit the standards of the portable terminal, the proxy unit 4121 outputs video signals corresponding to the converted contents to the display driver 416 so that the corresponding contents may be displayed on the display 417.

Also, the proxy unit 4121 stores the converted contents in the memory 413, and in this instance, can also drive the channeling unit 4124 to bind a plurality of contents respectively provided by the web servers or the contents provided by a single web server into a single channel and store the same in the memory 413.

Therefore, in the case of the contents generated to fit the standards of general computers, since the contents are displayed on the display 417 of the contents processing system 400, that is, the portable terminal, or are stored in the memory 413, the user can freely utilize the contents provided by the web server 600.

A contents processing system according to a fourth preferred embodiment will now be described.

In the fourth preferred embodiment, a user terminal such as a personal computer executes a predetermined program by its computation function so as to process the contents provided on the Internet to fit the standards of the portable terminal and then transmit the same to the corresponding portable terminal.

Figure 10:
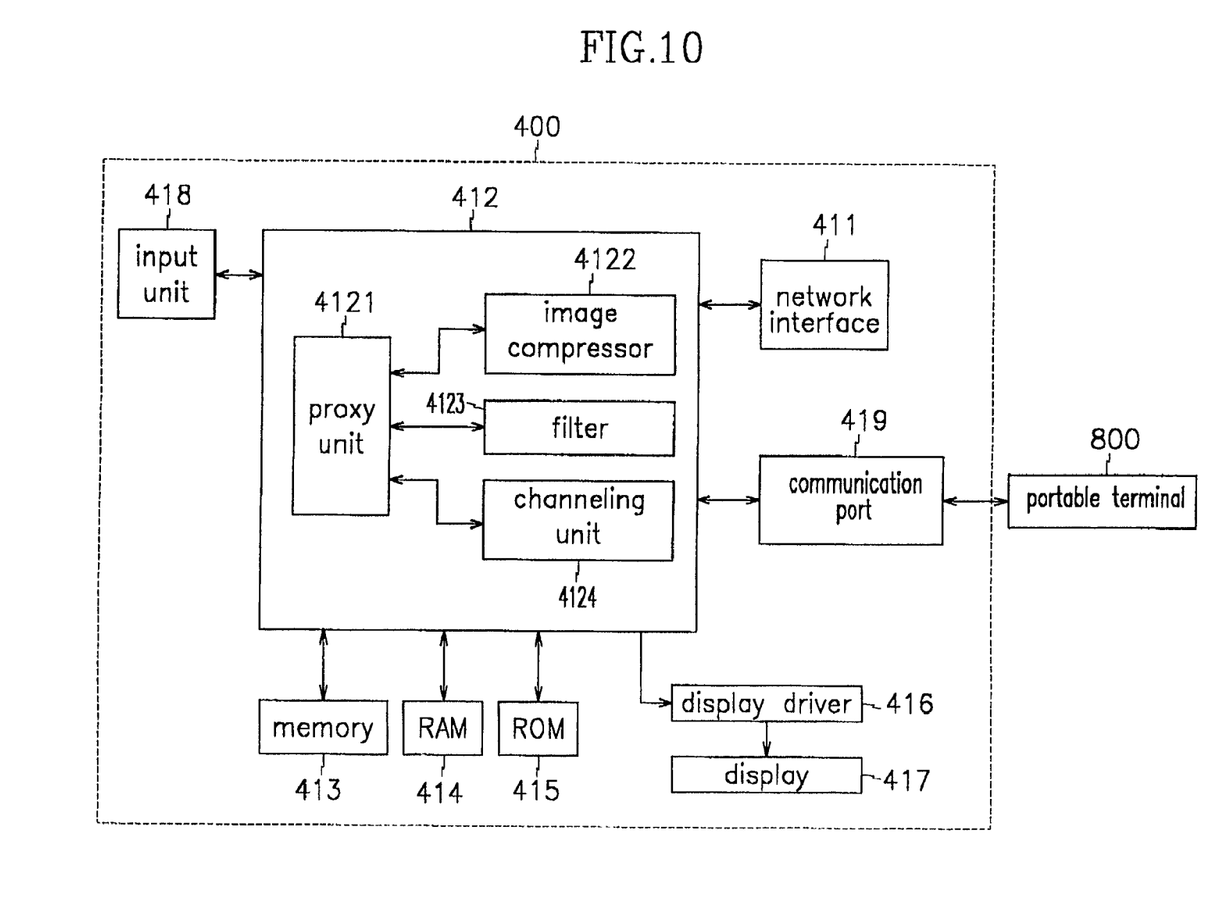
FIG. 10 shows a contents processing system according to a fourth preferred embodiment of the present invention.

FIG. 10 shows a schematic diagram of a contents processing system according to the fourth preferred embodiment of the present invention.

As shown, the contents processing system receives the contents from the web servers, converts the contents to fit the standards of the portable terminal, and transmits the converted contents to the portable terminal 800 connected via an additional communication line (including wire and wireless lines).

Hence, the contents processing system comprises a communication port 419 connected to the portable terminal 800. Since remaining units of FIG. 10 respectively have configurations identical with those of the previously described third preferred embodiment, no further description will be provided.

The communication port 419 can be wire connection communication ports such as serial ports and parallel ports, or wireless connection infrared ports. The contents processing system can be a general personal computer or a portable terminal.

Figure 11:
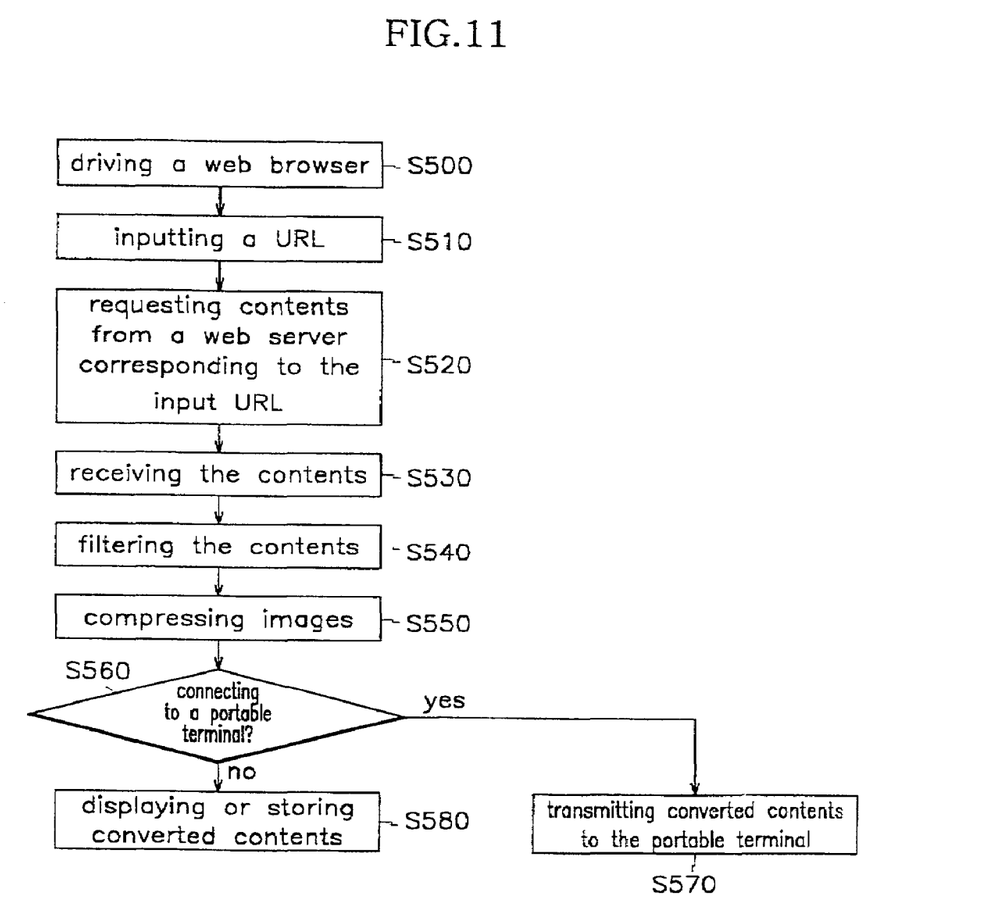
FIG. 11 shows an operation of the contents processing system according to the fourth preferred embodiment of the present invention.

With reference to FIGS. 10 and 11, an operation of processing the contents will be described.

FIG. 11 shows an operation of the contents processing system according to the fourth preferred embodiment of the present invention.

As shown, when a user inputs a URL to access the corresponding web server 600 and the web server 600 transmits the contents to the proxy unit 4121 according to a contents request by the proxy unit 4121 in steps S500 to S530, the proxy unit 4121 transmits the contents to the filter 4123 to filter information that is inappropriate or not necessary for the portable, terminal, from among the contents provided by the web server in step S540, and after the filtering of the information, the proxy unit 4121 calls the image compressor 4122 to convert the contents by reducing the sizes and number of colors of the image and compressing the image according to the established parameters in step S550.

After this, the proxy unit 4121 is connected to the portable terminal via the communication port 419, and when a request to transmit the contents to the portable terminal is input by the portable terminal 800 or the input unit 418, the proxy unit 4121 of the controller 412 transmits the contents processed by the filter 4123 or the image compressor 4122 to the portable terminal 800 via the communication port 419 in steps S560 and S570.

In the case of transmitting information, the proxy unit 4121 controls transmission timing of respective streams of a web page (e.g., an HTML including images) that includes a plurality of streams. For example, the proxy unit 4121 initially transmits the whole text of the web pages that have both text and images, and then transmits the images of the web pages.

However, in the case the portable terminal is not connected to the communication port 419, or in the case the portable terminal is connected to the communication port 419 and a request for transmitting the contents to the portable terminal is not input by the portable terminal 800 or the input unit 418, the information processed by the image compressor 4122, the filter 4123 and the channeling unit 4124 is stored in the memory 413 or is displayed on the display 417 in step S580.

As described, the contents transmitted by the web server 600 are processed and transmitted in real time to the portable terminal 800 via the communication port 419. Also, while a plurality of contents provided by a plurality of web servers are processed to fit the portable terminal and are stored in the memory 413, when a portable terminal is connected and a request for providing the contents is input via the communication port 419 or a request for providing the contents to the portable terminal 800 is input via the input unit 418, the proxy unit 4121 reads the contents stored in the memory 413 and transmits the same to the portable terminal 800 via the communication port 419.

Therefore, in the contents processing according to the fourth preferred embodiment, the contents provided by the respective web servers are processed to fit the portable terminal, and accordingly, the portable terminal user can easily read the contents provided by the general contents provider.

Also, since the contents provided by the web server are compressed and transmitted to the portable terminal by the contents processing system of the present invention, the portable terminal user can quickly receive desired contents.

Further, the proxy unit, the image compressor, the filter and the channeling unit can be implemented as RAM resident software driven by the controller and stored on media such as a hard disk drive, a floppy disk or a compact disc.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

For example, as to modifications and variations, the portable terminals can be PDAs, portable phones or other types of terminals. The orders of the processes of filtering, contents compression, and channeling can be changed if necessary.

In the preferred embodiments, the contents provider provides the contents via the Internet, and can further provide them via other network formats.

As described above, since the contents provided by the web server are converted according to standards, performance and parameters of the portable terminal and then transmitted, the portable terminal user can appropriately receive information from the contents providers that aim at general computer users.

Since the contents provided by the web server are compressed and transmitted, the user can effectively receive information under relative slow wireless network environments.

Also, since the contents provided by the web servers are bound into a single channel and this bound (i.e., channeled) information is transmitted to the portable terminal at one time, the user can receive desired contents at one time without individually accessing a plurality of web servers using the portable terminal.

What is claimed is:

1. A data server, to which a portable terminal is connected via a network for receiving contents from a plurality of web servers that respectively provide the contents, comprising:
   an image compressor for reducing sizes or number of colors of images;
   a proxy unit for determining whether a uniform resource locator (URL) received from the portable terminal is a channel URL associated with a set of URLS, each URL of the set corresponding to a web server that provides contents of a predetermined subject, and if so, requesting the contents from the plurality of web servers associated with the respective URLs of the set, monitoring the contents received from the plurality of web servers in response to the requesting to determine whether any of the received contents include image information, and if any of the received contents include image information, calling the image compressor to convert the image information by reducing sizes or number of color of images according to standard of the portable terminal;
   a channel generator for gathering the received contents of the predetermined subject and binding the gathered contents into a single channel of contents prior to transmission of the single channel of contents to the portable terminal,
   wherein the proxy unit transmits the single channel of contents to portable terminal, and
   wherein the portable terminal includes a plurality of channel icons that respectively have channel URL information of a predetermined subject, and wherein a user selection of a channel icon of the portable terminal causes the respective channel URL to be transmitted from the portable terminal to the data server.

2. The data server of claim 1, further comprising a filter for filtering information that is inappropriate or not necessary for the portable terminal, from among the contents transmitted by the web servers.

3. The data server of claim 1, wherein the channel generator inserts advertisement contents into the contents of the predetermined subject and channels them.

4. The data server of claim 1, wherein the web servers provide the contents to the data server via the network.

5. The data server of claim 1, wherein the channel icon of the portable terminal is downloaded from the data server.

6. The data server of claim 1, wherein the portable terminal comprises a program for making or editing the channel icon.

7. The data server of claim 1, wherein the portable terminal receives the channel icon via a computer, the channel icon being made or edited by the user using the computer that includes the program for making or editing the channel icon.

8. In a service method of a network service system having a data server, to which a portable terminal is connected via the network for receiving contents from a plurality of web servers that provide the contents, the portable terminal including a plurality of channel icons that respectively have channel URL information of a predetermined subject, and wherein a user selection of a channel icon of the portable terminal causes the respective channel URL to be transmitted from the portable terminal to the data server, a network service method comprising:
   determining whether a uniform resource locator (URL) received from the portable terminal is a channel URL associated with a set of URLS, each URL of the set corresponding to a web server that provides contents of a predetermined subject, and if so, requesting the contents from a plurality of web servers associated with the respective URLs of the set;
   monitoring the contents received from the plurality of web servers in response to the requesting to determine whether any of the received contents include image information, and if any of the received contents include image information, converting the image information by reducing sizes or number of color of images according to a standard of the portable terminal;

gathering the received contents of the predetermined subject and binding the gathered contents into a single channel of contents prior to transmission of the single channel of contents to the portable terminal; and transmitting the single channel of contents to the portable terminal via the network.

9. The network service method of claim 8, further comprising: filtering information that is inappropriate or not necessary for the portable terminal, from among the contents provided by the web server.

10. The network service method of claim 9, wherein in the performance of channeling, advertisement contents are inserted into the contents of a predetermined subject and then a channeling step is performed on them.

11. In a network service system, to which a portable terminal is connected via the network for receiving contents from a plurality of web servers that provide the contents, the portable terminal including a plurality of channel icons that respectively have channel URL information of a predetermined subject, and wherein a user selection of a channel icon of the portable terminal causes the respective channel URL to be transmitted from the portable terminal to the data server, a network service system comprising:
 a data server for determining whether a uniform resource locator (URL) received from the portable terminal is a channel URL associated with a set of URLS, each URL of the set corresponding to a web server that provides contents of a predetermined subject, and if so, retrieving the contents from the plurality of web servers associated with the respective URLs of the set, gathering the contents of a predetermined subject provided by the web servers and binding them into a single channel, processing the contents of the single channel to convert them according to standards of the portable terminal, and transmitting the single channel of converted contents to the portable terminal via the network; and
 an advertisement server, connected to the data server via the network, for storing various advertisement contents.

12. The system of claim 11, wherein the data server comprises:
 an image compressor for receiving the contents from the web servers, reducing sizes and number of colors of images of the contents and compressing the images according to standards of the portable terminal;
 a filter for filtering information that is inappropriate or not necessary for the portable terminal from among the contents transmitted by the web server;
 a channel generator for gathering the contents of a predetermined subject provided by the web servers and binding them into a single channel;
 a user database for storing user data corresponding to user information input by the portable terminal; and
 a proxy unit for monitoring the data transmitted by the portable terminal or the web server, and calling and controlling the image compressor, the filter and the channel generator according to the data.

13. The system of claim 12, wherein the proxy unit calls the image compressor when the contents transmitted by the web server include image information.

14. The system of claim 12, wherein the proxy unit checks whether a URL input by the portable terminal is a channel URL that is of a set of URLs of the web servers that provide the contents of a predetermined subject, and in the case the URL input by the portable terminal is a channel URL, the proxy unit calls the channel generator.

15. The system of claim 12, wherein the channel generator inserts advertisement contents transmitted by the advertisement server into the contents of a predetermined subject provided by the web server and binds them.

16. The system of claim 15, wherein the proxy unit extracts user data corresponding to user information input by the portable terminal from the user database and transmits the extracted user data to the advertisement server, and the advertisement server transmits the advertisement contents based on the extracted user data to the proxy unit.

17. The system of claim 16, wherein the user information includes ID and passwords, and the user data include at least one of user's general information, electronic commerce information and previously transmitted advertisement information.

18. The system of claim 16, wherein the advertisement server is connected to the data server via an exclusive network.

19. The system of claim 16, wherein the advertisement server connected to the data server via the network is a web server of an advertisement contents provider.

20. The system of claim 16, wherein in the case the converted contents comprise a plurality of streams, the proxy unit controls timing of each transmission stream.

21. In a network service method of a network service system, to which a portable terminal is connected via the network for receiving contents from a plurality of web servers that provide the contents, the portable terminal including a plurality of channel icons that respectively have channel URL information of a predetermined subject, and wherein a user selection of a channel icon of the portable terminal causes the respective channel URL to be transmitted from the portable terminal to the data server, a network service method comprising:
 searching, when a uniform resource locator (URL) of a web server for providing the contents via the portable terminal and user information are input, a user database and extracting user data;
 determining whether the inputted URL is a channel URL associated with a set of URLS, each URL of the set corresponding to a web server that provides contents of a predetermined subject, and if so, requesting the contents from a plurality of web server associated with the respective URLs of the set, and transmitting the extracted user data to an advertisement server;
 filtering information that is inappropriate or not necessary for the portable terminal from among the contents received from the plurality of web servers, the filtering comprising reducing sizes or number of colors of images of the contents or compressing the images according to a standard of the portable terminal, and inserting advertisement contents corresponding to the user data transmitted by the advertisement server into the filtered contents to convert the contents;
 gathering the filtered contents of the predetermined subject binding the gathered contents into a single channel of contents; and
 transmitting the single channel of contents to the portable terminal via the network.

* * * * *